2,969,143
PRESSURE-SENSITIVE ADHESIVE TAPE

John M. De Bell, Longmeadow, Mass., assignor to Phillips Petroleum Company, a corporation of Delaware
No Drawing. Filed May 17, 1956, Ser. No. 585,409
12 Claims. (Cl. 206—59)

This invention relates to a novel pressure-sensitive adhesive tape. In one aspect, the invention relates to the use of a novel chlorinated polymer as a backing film in the manufacture of an improved pressure-sensitive adhesive tape.

In recent years, plastics have played an increasingly important role in the tape industry. Of the various types of adhesive tapes produced by the industry, plastics have perhaps found their most important application in the manufacture of pressure-sensitive adhesive tape. The use of plastics as a backing material has resulted in the acceptance of pressure-sensitive adhesive tape as an important industrial tool. Of the plastic backings, vinyl plastics have found the most widespread uses, with polyethylene also being employed to some extent. Perhaps the most extensive use for tape of this type is in the electrical and electronic industries. In these industries, they find their greatest application as a replacement for standard rubber-plus-friction tape covering in splicing.

A pressure-sensitive adhesive tape is, in general, composed of two principal components, namely, the backing material and a suitable adhesive coating applied to one surface of the backing. In some cases, a primer layer or key coat is used to anchor the adhesive to the backing film. For certain uses, it is important that the tape possess among others the properties of flexibility and extensibility. When employing a plastic film such as polyvinyl acetate or polyvinyl chloride as the backing material, it is necessary to use with the polymer a plasticizer in order to impart to the material the desired physical properties. In the case of polyvinylchloride backing, it has been found that unless a large amount of plasticizer is added, e.g., in excess of about 20 parts of plasticizer per 100 parts polymer, the vinyl film is stiff and rigid. When larger amounts of plasticizer are added in order to improve the physical properties, there is a tendency for the plasticizer to migrate from the film to the adhesive coating. As a result, the adhesive layer becomes increasingly soft and pasty so that the tape loses its adhesive strength and becomes ineffective for its intended use. While conventional polyethylene films are not subject to this problem encountered with vinyl film, polyethylene presents problems as a backing material in several other respects. For example, it has proven difficult to formulate a suitable adhesive mass which overcomes the physical and chemical inertness of the polyethylene and thus key the adhesive to the film. Furthermore, to mention a few unsatisfactory physical properties, polyethylene film is low in flame resistance and is subject to oxidation, thereby rendering a tape using polyethylene as a backing material unsatisfactory for certain uses and generally unsatisfactory for extended periods of use. In accordance with the instant invention, an improved pressure-sensitive adhesive tape is provided which possesses outstanding physical properties and which overcomes and eliminates many of the problems and disadvantages associated with the prior art tapes.

It is an object of this invention to provide a novel, improved pressure-sensitive adhesive tape.

Another object of the invention is to provide a pressure-sensitive adhesive tape which retains its adhesive strength after extended periods of time.

Still another object of the invention is to provide a pressure-sensitive adhesive tape in which the adhesive layer, after an extended period of time in storage or use, does not lose its desirable property of "tack" and does not become soft and pasty.

A further object of the invention is to provide a pressure-sensitive adhesive tape having a novel backing film which contains no ingredient which adversely affects the adhesive properties of the adhesive layer.

A still further object of the invention is to provide a pressure-sensitive adhesive tape having as a backing film a novel chlorinated polymer which does not contain a plasticizing agent.

Still another object of the invention is to provide a pressure-sensitive adhesive tape which possesses outstanding physical properties, e.g., low water absorbability, substantial flame resistance, high extensibility and retractability after extension, high tensile strength, very low brittleness temperature, high resistance to oxidation, and good electrical characteristics.

Other and further objects and advantages of the invention will become apparent to one skilled in the art upon consideration of the accompanying disclosure.

Broadly speaking, the instant invention resides in a pressure-sensitive adhesive tape comprising as a backing film a chlorinated polymer selected from the group consisting of a chlorinated homopolymer of ethylene, a chlorinated homopolymer of propylene, and chlorinated copolymers of ethylene and other unsaturated hydrocarbons polymerizable therewith, and a pressure-sensitive adhesive material formed as a coating on one side of the backing film. The chlorinated polymer generally contains from about 10 to about 55 weight percent chemically combined chlorine. Although in some cases a chlorinated polymer having a somewhat higher chlorine content gives a satisfactory backing film, it has been found that in most instances chlorine contents in excess of about 55 weight percent give chlorinated polymers which have a tendency to be somewhat hard and brittle. The chlorinated polymer used as the backing material is produced from a polymer having an inherent viscosity of at least 0.8, preferably one having an inherent viscosity between about 1.2 and about 10. As used herein, the inherent viscosity is determined for a solution of 0.2 gram of polymer in 50 cc. of tetralin at 130° C. The molecular weight of the polymer can be conveniently calculated by multiplying the inherent viscosity determination by 24,450. See Kemp and Peters, Ind. Eng. Chem. 35, 1108 (1943), and Dienes and Klemm, Journal of Applied Physics, 17, 458–471 (June 1946).

The polymer used in preparing the chlorinated polymeric backing material in addition to being one having the above described inherent viscosity preferably has a density of at least 0.94 at 20° C. and a crystallinity of at least 80 percent at room temperature. More desirably, the density at 20° C. is at least 0.95 and the crystallinity at room temperature is at least 90 percent. The crystallinity of the polymer can be determined according to the method of Matthews, Perser and Richards, Acta Crystallographica 2, 85 (1949). Although the instant invention is not limited by any theory, it is believed that the specified high density and crystallinity of the polymer used indicate a predominantly preponderantly straight chain structure in the polymer with a low degree of branching.

Polymers used in the preparation of the chlorinated polymeric backing film are preferably produced by the method set forth in the copending application of Hogan and Banks, Serial No. 476,306, filed December 20, 1954. The polymeric starting material suitable for use in producing the backing film can be produced by contacting an olefin selected from the group consisting of ethylene, propylene and mixtures of ethylene and other unsaturated hydrocarbons, e.g., mixtures of ethylene with minor amounts of monoolefins containing up to and including 6 carbon atoms per molecule, such as propylene, 1-butene, and 1-pentene, with a catalyst comprising, as an essential ingredient, chromium oxide, preferably including a substantial amount of hexavalent chromium, as described in the aforementioned application. The chromium oxide is ordinarily associated with at least one other oxide particularly at least one oxide selected from the group consisting of silica, alumina, zirconia, and thoria. The temperature for the polymerization reaction is usually in the range from about 100 to 500° F., with a temperature in the range of 150 to 375° F. being often preferred for the polymerization of ethylene. The polymerization is frequently conducted with the olefin in admixture with a hydrocarbon which can be maintained in the liquid phase and is inert under the polymerization conditions. Suitable hydrocarbons are paraffins and cycloparaffins, e.g., normal heptane, 2,2,4-trimethylpentane, cyclohexane and methylcyclohexane. A continuous slurry-type reaction technique is frequently preferred, the catalyst then being in powdered form, e.g., 40 to 100 mesh, and suspended in the hydrocarbon solvent. A pressure sufficient to maintain the solvent in the liquid phase is preferably employed, e.g., 200 to 700 p.s.i. When employing a suspended catalyst, a preferred polymerization temperature range is 200 to 325° F. In practicing the instant invention, it is preferred to use polyethylene as the starting material to produce the chlorinated polymeric backing film.

Other polymers suitable for use as a starting material can be obtained by proceeding in accordance with the processes disclosed in Belgian Patents Nos. 533,362 (November 16, 1954), 534,792 (January 11, 1955) and 538,782 (June 6, 1955), the first two patents being issued to Dr. Karl Ziegler and the latter to Montecatini Societá Generale per l'Industria Mineraria e Chimica Anonima and Dr. Karl Ziegler. As discussed in Belgian Patent No. 533,362, a solid polymer of ethylene can be produced by contacting ethylene with catalyst composed of mixtures of aluminum trialkyls, such as triethylaluminum and triisobutylaluminum, and compounds of metals of subgroups IV to VI of the periodic system, such as titanium tetrachloride. Belgian Patent No. 534,792 indicates polyethylene can be produced by contacting ethylene with a catalyst consisting of mixtures of aluminum compounds of the general formula $R_2AlX$, wherein R is a hydrogen or a hydrocarbon radical or residue and X is hydrogen, halogen, an aryloxy or alkyloxy group, or the radical of a secondary amine, a secondary acid amide, mercaptan or thiophenol, or a carboxylic or sulfonic acid, such as diethylaluminum chloride and diisobutylaluminum chloride, with compounds of metals of groups IVB to VIB of the periodic system, such as titanium tetrachloride. As disclosed in Belgian Patent No. 538,782, polypropylene and polymers of higher olefins can be produced by contacting the olefin with a catalyst obtained by reaction of compounds of metals of groups IVB to VIB of the periodic system, such as titanium tetrachloride, with metals, alloys, metallic hydrides, or metal-organic compounds of groups IA to IIIA of the periodic system, such as triethylaluminum and diethylaluminum chloride. When using the polymers described in the latter patent as a starting material, it is preferred to use the polymers after separation of the amorphous polymers as described therein.

As indicated hereinabove, the chlorinated polymer contains from about 10 to about 55 weight percent chemically combined chlorine. Because of certain properties imparted to the chlorinated polymer, as discussed hereinafter, is is frequently preferred that the chlorinated polymer contain from about 20 to about 55 weight percent chemically combined chlorine. In some cases, it is desirable that the chlorinated polymer contain from about 17 to about 33 weight percent and more desirably from about 20 to about 30 weight percent combined chlorine. Chlorinated polyethylenes having chlorine contents in these latter ranges which can be advantageously used are described in detail in the copending U.S. application Serial No. 533,433, filed September 9, 1955, by Canterino and Scott. By altering the chlorine content of the chlorinated polymeric backing film of this invention, it is possible to obtain a tape having various properties which render it suitable for a wide variety of uses.

A preferred method of chlorination is described in the copending U.S. application Serial No. 442,891, filed July 12, 1954, by P. J. Canterino. In general, this method involves dissolving the polymer, such as polyethylene, in a volatile solvent, such as carbon tetrachloride, at a temperature above the normal boiling point of the solvent and a superatmospheric pressure sufficient to maintain the solvent substantially in the liquid phase, e.g., 80 to 120° C. and 5 to 100 p.s.i.g. A chlorination agent is then added. Usually elemental chlorine is passed through the solution until a partially chlorinated product, generally containing about 15 weight percent combined chlorine, is obtained. This intermediate product is soluble in carbon tetrachloride at atmospheric pressure and temperatures up to the boiling point of carbon tetrachloride. The temperature and the pressure are then lowered, e.g., to between 50 and 70° C. and atmospheric pressure, and the chlorination is then continued to the desired extent. The solvent can be removed by volatilization and the chlorinated polymer recovered as a residue. Alternatively, an antisolvent can be added to precipitate the chlorinated polymer which can then be recovered by filtration.

Another suitable chlorination method is described in copending U.S. application Serial No. 446,666, filed July 9, 1954, by Canterino and Baptist. This method involves conducting the initial chlorination (up to at least about 15 weight percent combined chlorine) with the polymer in solution in a solvent such as 1,1,2,2-tetrachloroethane, and any further chlorination desired can be conducted with carbon tetrachloride or a similar compound as the solvent.

In each of the foregoing methods, the entire chlorination can be conducted in a single stage utilizing tetrachloroethane as the solvent or carbon tetrachloride at superatmospheric pressure and a temperature above the normal boiling point of carbon tetrachloride.

The chlorinated polymer produced in accordance with the above described methods can be formed into film of a desired thickness for use in the preparation of the pressure-sensitive adhesive tape of this invention by methods which are described in the literature. For example, the chlorinated polymer can be made into film by extruding, calendering, or blowing. The thickness of the backing film can vary over a fairly wide range, but it is generally in the range of about 3 to 50 mils. However, for most uses, the film will usually have a thickness between 5 and 15 mils.

As previously indicated, the novel backing film of the invention is coated with a pressure-sensitive adhesive. While the instant invention is not dependent upon the use of any particular adhesive, the material utilized should possess certain desirable properties. In general, the adhesive should exhibit the property known as "tack" and should possess an adhesive strength commensurate with the use for which the tape is intended. The adhesive should possess a cohesive strength such that it will cohere to the film backing and will not be removed therefrom when handled or when separated from the surface with which it may be in contact. Since pressure-sensitive adhesive tape is generally wound upon itself on a spool, it is important that the tape be capable of being unwound without separation of the adhesive layer from the backing film. In general, any suitable adhesive formulation which coheres to the chlorinated polymeric backing film and possesses sufficient tack to provide the desired adhesive properties can be utilized. The adhesives employed with polyvinyl chloride films are in general adapted for use with the backing film of this invention.

The basic ingredients for suitable adhesive masses include elastomeric materials such as reclaimed rubber; natural rubber, synthetic rubbers, such as polybutadiene, butadiene-styrene copolymers, and polychloroprene; and polyvinyl ethers. The resins which act as plasticizers for the elastomeric material and convert it to a pressure-sensitive adhesive, can be either natural or synthetic. Synthetic materials which can be used and which have proven to be more adaptable than natural resins range from polyvinyl acetate and polyisobutylene to coumarone-indene resins and acrylic ester polymers. The choice of a suitable resin to give an adhesive formulation which possesses the adhesive properties desired and which is easy to apply to the backing film can be readily made by one skilled in the art. In addition to the principal components, i.e., elastomers and resins, various other materials are included in the adhesive mass, e.g., modifying plasticizers, fillers, antioxidants, stabilizers, softeners and pigments. The fillers alter the flow characteristics of the adhesive mass while the stabilizers are employed to improve the aging of the elastomer. Pigments can be added to the adhesive and to the backing film as well, in order to give the finished product any desired color. The adhesive properties of adhesive masses can be readily varied by altering the proportions of the various components of the formulations. For example, for certain uses it may be desirable to alter the tack of the adhesives. Thus, when the tape is to be used as a surgical tape, it is desirable to employ an adhesive which is not too tacky, and this can be accomplished by adding softeners, such as lanolin or liquid paraffin, to the adhesive formulation. An example of a rubbery-resinous adhesive formulation which can be used in the practice of the instant invention is set forth below; however, it is to be understood that it is not intended to limit the invention to any specific adhesive.

ADHESIVE RECIPE

| | Parts by weight |
|---|---|
| Butadiene-styrene copolymer | 100. |
| Coumarone-indene resin | 20–100. |
| Zinc oxide and other fillers | 5–100. |
| Paraffin oil | 0–50. |
| Antioxidant | Small amount. |
| Alcohol | Variable (to control viscosity). |
| Heptane or other solvent | 100–1000. |

The adhesive mass can be prepared by methods which are described in the literature. In one method of compounding an adhesive mass, the elastomer is first ground between heavy rollers at high temperatures. During the grinding step, measured quantities of the resins, modifying plasticizers, fillers, stabilizers, softeners and pigments used in the particular formulation are added. Thereafter, the mass is fed between two side-by-side horizontal heated rollers. When the mass adheres to one of the rolls as a soft, sticky adhesive, it is removed therefrom, cooled and then aged for a specified period.

The adhesive mass can be applied to the backing film by either calendering or solvent spreading. In calendering, three horizontal steel rolls are generally used, the rolls being placed one on top of the other. The adhesive mass is fed between the top two heated rollers, and a temperature difference causes the adhesive to adhere to the middle roller. The backing film is fed at the same time between the middle and bottom rollers. When the backing film and the adhesive meet, the adhesive adheres to the backing film, thus forming the finished tape. The finished tape is then wound as it comes from the rolls and slit to a predetermined desired width. In the manufacture of tape by solvent spreading of the adhesive, a solvent is first mixed with the adhesive mass until a syrupy liquid is obtained. This liquid is then pumped into a tank from which it runs into a trough where it is knife-spread over the film backing. After the solution of the adhesive is spread on the film, the tape is passed into a drying oven where the solvent is evaporated. It is then wound and afterwards cut on a lathe with a cutting knife. It is to be understood that the adhesive is applied as a thin layer which constitutes only a small part of the overall tape thickness. In general, from about 10 to about 50 grains of adhesive on a dry basis are applied per 100 sq. in. of backing film.

In some cases, a primer layer or key coat is first spread on the backing film in order to improve the adhesive properties of the final product. Thereafter, the adhesive is spread over the primer layer, thereby improving the keying of the adhesive to the backing film. The primer formulations utilized often include a chlorinated rubber or an acrylonitrile-butadiene copolymer as well as a resin and a hydrocarbon solvent. The primer coat can be readily applied by solvent spreading as described above, after which the backing film is dried before application of the adhesive layer to remove solvent from the primer. Primer coats found to be useful with polyvinyl chloride can also be utilized in the preparation of the pressure-sensitive adhesive tape of this invention. An example of a primer formulation is set forth hereinbelow; however, it is to be understood that it is not intended to limit the invention to any particular primer recipe.

PRIMER RECIPE

| | Parts by weight |
|---|---|
| Butadiene-acrylonitrile copolymer | 100 |
| Terpene resin | 20–100 |
| Hydrocarbon solvent | 100–1000 |

The use of the hereinabove described chlorinated polymer as a backing film in forming the pressure-sensitive adhesive tape of this invention results in a product which exhibits many outstanding physical properties. Because of these physical properties, the tape of this invention is suitable for a wide variety of uses. Furthermore, employment of this novel backing material eliminates or substantially alleviates many of the problems encountered with the prior art tapes.

One of the very important advantages of the instant tape is that it is unnecessary to add a plasticizer to the chlorinated polymer in order to impart to the backing film the desirable properties of flexibility and extensibility. In the case of certain backing films, e.g., polyvinyl chloride, it is necessary to add a large amount of a plasticizer to the polymer to obtain a composition which is not stiff and rigid. There is a tendency for the plasticizer to migrate from the film to the adhesive layer or coat, thereby causing the adhesive to become increasingly soft and pasty and rendering the tape ineffective and unsatisfactory for its intended use. By using the chlorinated polymer (unplasticized) to form the backing film of this invention, the problem of a migrating plasticizer is entirely eliminated.

The outstanding properties possessed by the tape of this invention are to a large extent directly attributable to the fact that a chlorinated polymer is used as the backing film. Furthermore, the chlorine content of the polymer appears to have a direct relation to certain properties of the tape. For example, by varying the chlorine content, a tape can be obtained which is extensible to at least 50 percent and in some cases in excess of 100 percent of its original length and which thereafter retracts to substantially its original length. It has been found that when the chlorine content of the polymer is in the range of about 20 to 55 weight percent, the tape possesses the desirable property of being readily and easily stretchable and substantially completely retractable. For example, when a chlorinated polyethylene prepared as described herein and containing 22.4 weight percent chlorine was stretched by hand 100 percent, 100 percent retraction was immediately obtained. A chlorinated polyethylene containing 34 weight percent chlorine when stretched 500 percent retracted 475 percent while one with 53 weight percent chlorine when stretched 200 percent retracted 190 percent in 2 or 3 minutes. The properties of extensibility and retraction are especially important when the tape is used as an insulating tape. For example, in splicing it is possible to place the materials being spliced, such as polymer-insulated wires, under tension by stretching the tape on application and then releasing, thereby providing a compact, tight, insulated covering.

It has been found that these desirable properties of extensibility and retraction as well as increased tensile strength can be given to certain of the chlorinated polymers by stretching the polymer to near its ultimate tensile strength so as to orient the polymer. The oriented polymers so produced have a high tensile strength and are extensible and capable of retracting to their original lengths, i.e., their length after orientation. In this regard, chlorinated polymers containing from about 17 to 33, preferably 20 to 30, chemically combined chlorine can be treated in this manner so as to orient the polymer and thereby provide an extensible polymer having a high tensile strength. While the chlorinated polymers containing less than 17 weight percent combined chlorine are not stretchable to any great degree and cannot be so rendered by orientation, the film obtained from these polymers is a clear material similar to cellophane and possesses many of the desirable properties, as discussed below, of the elastomeric chlorinated polymers.

The novel backing film of this invention possesses good electrical properties and is highly resistant to flame. This property of being flame resistant is especially evident in the chlorinated polymer having a high chlorine content, although it applies also to a somewhat lesser extent to the polymers having a low chlorine content. This property of being flame resistant is not possessed by tapes employing conventional polyethylene films so that polyethylene tapes are unsuitable for certain uses and are inferior in this regard to the tape of this invention. The tape of this invention is also highly resistant to oxidation, which is another property which renders the instant tape superior to polyethylene tapes. Because of its resistance to oxidation, the tape of this invention remains flexible after extended periods of usage and is not rendered brittle because of oxidation. The instant backing film also has a very low brittleness point being lower than $-190°$ F. when a chlorinated polyethylene containing 26 weight percent chlorine is used as the backing film. A polyvinyl chloride containing 50 parts of plasticizer per 100 parts of polymer has been found to have a brittleness temperature of $-30°$ F. It thus appears that the tape of this invention has good flexibility at temperatures far below those of tapes using a polyvinyl chloride backing film. The backing film of this invention also has a very low water absorbability being superior to polyvinyl chloride in this respect. Furthermore, the backing film is resistant to certain hydrocarbons, particularly aliphatic hydrocarbons.

In addition to the desirable properties which appear to be imparted to the adhesive tape of this invention by utilizing a chlorinated polymer as the backing film, the use of the chlorinated polymer is also important in still another respect. Thus, because the polymer contains chemically combined chlorine, there is a greater tendency for the adhesive material to cohere to the backing film. In the case of polyethylene films, difficulty has been encountered in arriving at a suitable adhesive formulation which can be anchored to the film. By using a chlorinated polymer as a backing film, this problem has been greatly simplified, and formulations generally found to be suitable for polyvinyl chloride films can be utilized with the backing film of this invention.

A more comprehensive understanding of the invention can be had by referring to the following illustrative examples which are not intended to be unduly limitative of the invention.

Example I

Ethylene was polymerized in a semi-commercial continuous operation employing a 60 gallon reactor over a chromium oxide-silica-alumina catalyst containing 2.3 weight percent chromium as chromium oxide. Cyclohexane was employed as the solvent for the reaction. The ranges in operating conditions were as follows:

| | |
|---|---|
| Polymer concentration in reactor, wt. percent | 7.9–8.5 |
| Catalyst concentration in reactor, wt. percent | 0.17–0.28 |
| Residence time, hours | 1.63–3.31 |
| Temperature, °F. | 281–282 |
| Pressure, p.s.i.g. | 420 |

The ethylene polymer had the following properties:

| | |
|---|---|
| Volatiles, wt. percent | 0.05 |
| Ash, wt. percent | 0.06 |
| Melt Index [1] | 0.52 |
| Impact strength, Izod (½″ x ¼″ bar), ft. lbs./in. notch [2] | 3.56 |

[1] ASTM D1238–52T; corresponding to a molecular weight of 44,000.
[2] ASTM D256–47T.

A pressure reactor provided with a stirrer was charged with 2.1 pounds of the ethylene polymer, prepared as described above, and 50 pounds of carbon tetrachloride. The reactor contents were heated to 220° F. and the pressure was regulated at 40 p.s.i.g. by addition of nitrogen above the reaction mixture. Chlorine (1.3 pounds) was introduced at a constant rate over a three-hour period while the mixture was stirred and irradiated with ultraviolet light. During the first two hours, the temperature dropped to 180° F. and it was maintained at this level during addition of the remainder of the chlorine. The mixture was allowed to cool after which it was poured into 30 gallons of isopropyl alcohol to precipitate the chlorinated polymer. The product was washed with isopropyl alcohol and dried in a vacuum oven at 60° C. for 16 hours. It was redissolved in carbon tetrachloride, treated with 40–50 grams of chlorine to remove the brownish color, allowed to stand two hours, and then poured into isopropyl alcohol to precipitate the product which was washed and dried as before. Analysis for chlorine gave a value of 23.4 weight percent.

The chlorinated polyethylene prepared as described above had the properties set forth in Table I hereinbelow. For purpose of comparison, there is also included in the table the properties of a polyvinyl chloride.

TABLE I

| | Chlorinated Polyethylene | | Polyvinyl Chloride [1] | |
|---|---|---|---|---|
| Flex, Temperature, °F. | −30 | | −24 | |
| Brittleness Temp., °F.[2] | <−196 | | −35 | |
| Tensile strength, p.s.i. | 2029 | | 2520 | |
| Elongation, percent | 846 | | 223 | |
| | 1 Kilocycle | 1 Megacycle | 1 Kilocycle | 1 Megacycle |
| Electrical Properties: | | | | |
| Dielectric Constant | 4.77 | 3.58 | 5.29 | 3.19 |
| Dissipation Factor | 0.0157 | 0.1060 | 0.122 | 0.0789 |
| Water absorption, wt. gain. wt. percent [3] | 0.097 | | 0.11 | |

[1] A commercial polyvinyl chloride (Geon–101 sold by B. F. Goodrich Company) plasticized with 50 parts of dioctylphthalate per 100 parts of polymer.
[2] ASTM D746–52T.
[3] Test made on discs 2″ in diameter and ⅛″ thick. The discs were immersed in water at 77±3° F. for 24 hours after which a determination of the gain in weight was made.

Example II

Ethylene was polymerized in a manner similar to that described in Example I to give a product having the following properties:

| | |
|---|---|
| Ash, wt. percent | 0.5 |
| Density | 0.961 |
| Melt index | 0.485 |
| Inherent viscosity | 1.910 |
| Flex temperature, °F. | 32 |
| Impact strength, Izod, ft. lbs./in. notch [1] | 7.5 |
| Brittleness temperature, °F.[2] | <−184 |
| Tear strength, g./mil | 377 |
| Tensile, p.s.i. | 4170 |
| Elongation, percent | 24 |

[1] As in Example I.
[2] As in Example I, Table I.

A pressure reactor provided with a stirrer was charged with 2.1 pounds of the ethylene polymer and 55 pounds of carbon tetrachloride. The reactor contents were heated to 210° F. and the pressure was regulated at 40 p.s.i.g. by addition of nitrogen above the reaction mixture. Chlorine (1.5 pounds) was introduced at a constant rate over a period of 2.5 hours while the material was stirred and irradiated with light from a 4 watt fluorescent bulb. Subsequent to addition of the chlorine, nitrogen was passed through the mixture while it was being cooled to strip out hydrogen chloride and unreacted chlorine. It was then heated and more nitrogen was passed through it to remove the remainder of the hydrogen chloride. Thirteen grams of a heat stabilizer, Ferro 909 (100 percent epoxy resin), was added and the chlorinated product was precipitated by pouring the reaction mixture into isopropyl alcohol. The precipitate was washed with isopropyl alcohol, soaked for 16 hours in isopropyl alcohol, separated, and dried in an air oven at 150 to 160° F. for 16 hours. Analysis of the product for chlorine gave a value of 24.9 weight percent.

The chlorinated polymer was placed on a roll mill at 220° F. and 3 parts by weight per 100 of the polymer of a sodium organo-phosphate heat stabilizer (Ferro 541A) was added. A film was extruded from this material using a barrel temperature of 350° F. and a die temperature of 400° F. Tensile strength of the film, pulled at the rate of 20 in./min., was 3708 p.s.i. and the elongation was 940 percent. A sample of the film was oriented by cold drawing at 0.2 in./min. to 850 percent elongation. Tensile strength of the material, pulled at 20 in./min., was 10,240 p.s.i. The elongation was 32 percent.

Another sample of the film was oriented by cold drawing at 0.2 in./min. to 700 percent elongation. It was then allowed to relax for 18 hours. It had retracted to 400 percent elongation (based on original sample). This sample was stretched again to the original 700 percent elongation and allowed to retract. It retracted immediately to 425 percent elongation, i.e., to substantially its length after orientation. These data show that the material has elastomeric properties and that the oriented film can be stretched in excess of 50 percent and thereafter immediately retract to about its oriented length. The ethylene polymer used was from Run WF–442.

Example III

A sample of the ethylene polymer described in Example II was chlorinated by dissolving 200 grams in 3.5 liters of tetrachloroethane at 115° C. (239° F.) and introducing 100 grams of chlorine over a 2.5-hour period. The operation was effected at atmospheric pressure at a temperature of 110–115° C. (230–239° F.). The mixture was stirred and irradiated with ultraviolet light during addition of the chlorine. The product was recovered by pouring the material into isopropyl alcohol, washing the precipitated product with isopropyl alcohol, and finally drying it in a vacuum oven 16 hours at 60° C. Analysis for chlorine gave a value of 14.8 weight percent. This material can readily be made into a clear, flexible film which can be oriented by cold drawing.

The pressure-sensitive adhesive tape of this invention has utility in a wide variety of applications. As previously mentioned, one of the most important uses is as an insulating tape in the field of electricity. It can also be employed as a surgical tape in which case a material such as zinc oxide is added to the adhesive mass for dermatological reasons. (It is noted that zinc oxide, which is often used as an adhesive filler, also appears to increase the adhesive strength of the pressure-sensitive adhesive.) The tape can also be used as a protective wrapping for tools, pipe and other materials which one may desire to protect. In this regard, the tape is especially valuable in waterproofing operations because of its low water absorbability, it being understood that the pressure-sensitive adhesive employed is insoluble in water. Because the tape is readily conformable to irregular surfaces, it can be advantageously used in wrapping and sealing various types and shapes of containers. The tape can also be utilized in the sealing and joining of air and heating ducts and as a masking tape. Many other useful applications will suggest themselves upon a further consideration of the hereinbefore discussed outstanding properties of the pressure-sensitive adhesive tape of this invention.

It will be apparent that many modifications and variations of the instant invention can be made by those skilled in the art. Such modifications and variations are believed to come within the spirit and scope of the foregoing disclosure.

I claim:

1. A pressure-sensitive adhesive tape comprising as a film backing a chlorinated polymer selected from the group consisting of chlorinated polyethylene, chlorinated polypropylene, and chlorinated copolymers of ethylene and other unsaturated hydrocarbons polymerizable therewith, and a pressure-sensitive adhesive material formed as a coating on one side of said film backing.

2. A pressure-sensitive adhesive tape comprising as a film backing a chlorinated polymer selected from the group consisting of chlorinated polyethylene, chlorinated polypropylene, and chlorinated copolymers of ethylene and other unsaturated hydrocarbons polymerizable therewith, said chlorinated polymer containing from about 10 to about 55 weight percent chemically combined chlorine, and a pressure-sensitive adhesive material formed as a coating on one side of said film backing.

3. The pressure-sensitive adhesive tape of claim 2 wherein said chlorinated polymer contains from about 20 to about 55 weight percent chemically combined chlorine.

4. The pressure-sensitive adhesive tape of claim 2 wherein said chlorinated polymer contains from about 17 to about 33 weight percent chemically combined chlorine.

5. A pressure-sensitive adhesive tape comprising as a film backing a chlorinated polymer selected from the group consisting of chlorinated polyethylene, chlorinated polypropylene, and chlorinated copolymers of ethylene and other unsaturated hydrocarbons polymerizable therewith, said chlorinated polymer containing from about 10 to about 55 weight percent chemically combined chlorine and being produced from a polymer having an inherent viscosity of at least 0.8, and a pressure-sensitive adhesive material formed as a coating on one side of said film backing.

6. The pressure-sensitive adhesive tape of claim 5 wherein said chlorinated polymer is produced from a polymer having an inherent viscosity in the range of about 1.2 to 10.

7. A pressure-sensitive adhesive tape comprising as a film backing a chlorinated polymer selected from the group consisting of chlorinated polyethylene, chlorinated polypropylene, and chlorinated copolymers of ethylene and other unsaturated hydrocarbons polymerizable therewith, said chlorinated polymer containing from about 10 to about 55 weight percent chemically combined chlorine and being produced from a polymer having an inherent viscosity of at least 0.8, a density of at least 0.94 at 20° C. and a crystallinity of at least 80 percent at room temperature, and a pressure sensitive adhesive material formed as a coating on one side of said film backing.

8. The pressure-sensitive adhesive tape of claim 7 wherein said chlorinated polymer is produced from a polymer having an inherent viscosity in the range of about 1.2 to 10, a density of at least 0.95 at 20° C. and a crystallinity of at least 90 percent at room temperature.

9. The pressure-sensitive adhesive tape of claim 7 wherein said chlorinated polymer is chlorinated polyethylene.

10. The pressure-sensitive adhesive tape of claim 7 wherein said chlorinated polymer is chlorinated polypropylene.

11. The pressure-sensitive adhesive tape of claim 7 wherein said chlorinated polymer is a chlorinated copolymer of ethylene and propylene.

12. A pressure-sensitive adhesive tape formed in a roll by being wound upon itself and comprising (1) as a film backing a chlorinated polymer selected from the group consisting of chlorinated polyethylene, chlorinated polypropylene, and chlorinated copolymers of ethylene and other unsaturated hydrocarbons polymerizable therewith, said chlorinated polymer containing from about 10 to about 55 weight percent chemically combined chlorine and being produced from a polymer having an inherent viscosity of at least 0.8, a density of at least 0.94 at 20° C. and a crystallinity of at least 80 percent at room temperature; (2) an adhesive primer coat formed on the inner surface of said film backing; and (3) a rubbery, resinous type adhesive material formed as a coating upon said primer coat.

References Cited in the file of this patent

UNITED STATES PATENTS

| | | |
|---|---|---|
| 2,315,037 | Bannon | Mar. 30, 1943 |
| 2,395,668 | Kellgren et al. | Feb. 26, 1946 |
| 2,405,971 | McAlevy | Aug. 20, 1946 |